United States Patent
Warner

[11] 3,830,555
[45] Aug. 20, 1974

[54] NONRECIPROCAL WAVEGUIDE MODE CONVERTER

[76] Inventor: John Warner, 6429 Maplewood Dr., Falls Church, Va. 22041

[22] Filed: May 4, 1973

[21] Appl. No.: 357,157

[52] U.S. Cl.............. 350/96 WG, 350/151, 350/157
[51] Int. Cl.............................................. G02b 5/14
[58] Field of Search................................ 350/96 WG

[56] References Cited
UNITED STATES PATENTS
3,764,195   10/1973   Blank et al..................... 350/96 WG

OTHER PUBLICATIONS

Wang et al. "Studies of the Use of Gyrotropic and Anisotropic Materials for Mode Conversion in Thin-Film Optical-Waveguide Applications," J. Appl. Phys., Vol. 43, No. 4, Apr. 1972, pp. 1,861–1,875.

Wang et al. "Studies of Magnetooptic Effects for Thin-Film Optical-Waveguide Applications," IEEE Transactions On Magnetics, Vol. Mag–7, No. 3, Sept. 1971, pp. 385–387.

Wang et al. "Wave Propagation in Thin-Film Optical Waveguides Using Gyrotropic and Anisotropic Materials as Substates," IEEE Journal of Quantum Electronics, Vol. QE–8, No. 2, Feb. 1972, pp. 212–216.

*Primary Examiner*—John K. Corbin
*Attorney, Agent, or Firm*—R. S. Sciascia; Arthur L. Branning; M. L. Crane

[57] ABSTRACT

An optical waveguide which provides coupling between waveguide modes dependent upon the direction of propagation. The device comprises a sandwich of an anisotropic material, a neutral material and a magneto-optic material. Such a system may be used as an isolator or circulator in integrated optical circuits.

12 Claims, 3 Drawing Figures

PATENTED AUG 20 1974　　　　　　　　　　　　　3,830,555

⊙ ≡ TE Mode

↕ ≡ TM Mode

NONRECIPROCAL WAVEGUIDE MODE CONVERTER

BACKGROUND OF THE INVENTION

This invention relates to optical waveguides and more particularly to a non-reciprocal optical planar waveguide mode converter.

Essential to the proper development of integrated optical systems is the availability of the basic components for providing sources, detectors, waveguiding, modulation, switching, etc. Switching and modulation may be achieved by using electrooptic, acoustooptic, (both bulk and surface wave), and magnetooptic effects to couple the transverse electric, TE, and transverse magnetic, TM, modes of waveguide propagation and provide mode-conversion. For example, amplitude modulation may be achieved for a TE waveguide mode by applying an AC field to an electrooptic material that forms part of the waveguide structure. There will be induced a variable coupling to the TM mode and the TE and TM intensities will fluctuate in a complimentary way. Most mode-conversion systems are reciprocal in the sense that the effects produced are not altered by reversing the propagation. The exception to this is the longitudinal magnetooptic or Faraday effect (magnetization parallel to propagation direction). Faraday rotation devices have been found particularly useful in microwave waveguiding; they provide non-reciprocal transmission characteristics that have been exploited to make isolators and circulators invaluable to microwave circuitry.

A linearly polarized optical beam propagating along the magnetic field direction in an isotropic material finds its plane of polarization rotated as it proceeds. The effect is largest in ferromagnetic materials. Linearly polarized light behaves similarly in optically active materials but the magnetic effect is uniquely different in one important respect: the "handedness" of the rotation is opposite for waves propagating with and against the bias magnetic field. In an optically active crystal, the "handedness" is unaltered by a reversal of propagation direction.

In an article, "Studies of the Use of Gyrotropic and Anisotropic materials for Mode Conversion in Thin-Film Optical-Waveguide Applications" by Wang et al., J. Applied Physics Vol. 43, No. 4, pp 1,861–1,875, Apr. 1972, the use of such materials in providing mode-conversion between the TE and TM modes of a thin-film optical waveguide have been reported. The report mentions the possibility of using non-reciprocal waveguide mode-converters to accomplish the circuit functions of a circulator and isolator as well as other systems.

It is well known in the prior art that optical waveguides may be formed by a medium having an index of refraction which is greater than the medium below and above the medium. Such a waveguide has been set forth in an article, "Light Waves In Thin Films and Integrated Optics," by P. K. Tien, Applied Optics, 10, page 2,395, 1971.

SUMMARY OF THE INVENTION

This invention is directed to a non-reciprocal mode-converting dielectric optical waveguide structure comprising an anisotropic material, an isotropic material and a magnetooptic material formed into a sandwich of a desired order. A non-reciprocal mode converter is one in which the mode conversion is complete in one propagation direction and zero conversion in the reverse direction. Good mode conversion in one direction with zero mode-conversion in the reverse direction will only be achieved if two conditions are met. The first is that the transverse electric mode, TE, and transverse magnetic mode, TM, have the same guide velocity, that is, they are degenerate modes. This depends on the types of material used in each layer, the order of the different layers, the thickness of the central layer as well as the indices of refraction of the layers. The second condition is that the mode converting media (anisotropic and magnetooptic layers) must have equal conversion coefficients. (The sign of the magnetooptic coefficient changes on propagation direction reversal, thus the coefficients of the two media either add or substract to zero). The magnitude of the magnetooptic coefficient is set by the magnetization of the material; that of the anisotropic layer can be adjusted by altering the orientation of the layer with respect to the propagation direction.

DESCRIPTION OF THE INVENTION

Figure 1:
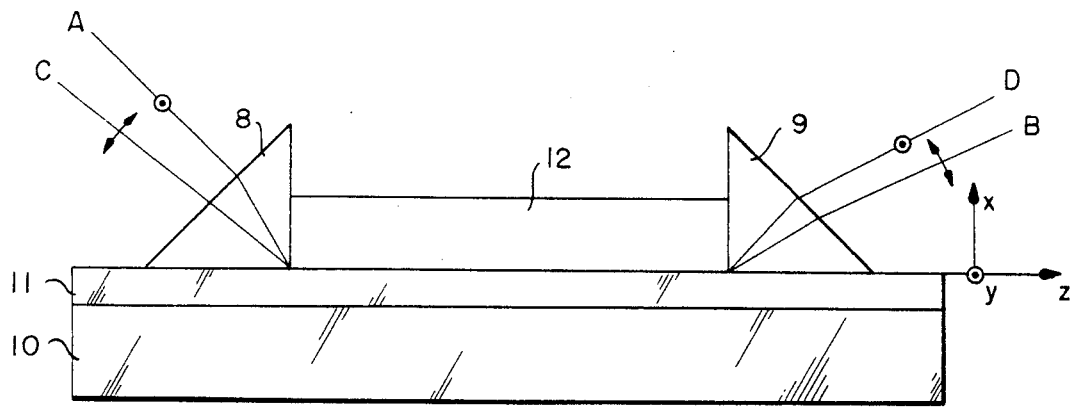
FIG. 1 illustrates a schematic drawing of a waveguide shown with input and output couplers.

Referring to the drawing FIG. 1, there is shown for illustrative purposes an optical waveguide formed of three different materials made into a sandwich and including input and output couplings 8 and 9. As shown, the substrate or bottom layer 10 is a neutral or an isotropic material such as Gadolinium Gallium garnet, the middle layer 11 is a thin film of magneto-optic material such as ferromagnetic garnet, YIG or a derivative of YIG, the top layer 12 is an optically active material or an anisotropic crystal such as Lithium Iodate, $LiIO_3$. The device is illustrated with input and output couplers for coupling light beams into and out of the waveguide. The drawing further indicates the XYZ planes, the TE mode, O, and the TM mode, ,. The arrows on the beams indicate the vibration direction of the electric vector of the electromagnetic wave.

In forming the device, the magnetooptic material is grown onto the substrate in any well known manner, then the top layer is secured to the magneto-optic-material layer by some suitable means. In forming the optical waveguide, the magnetization of the magnetooptic material is in the Z direction, the optical axis of the anisotropic material is set in the plane of the films at an angle of about 2° from the perpendicular to the magnetic field of the magnetooptic material. This angle is such that the anisotropic mode conversion coefficient equals that of the magnetooptic layer. In such a structure, in one direction the mode-conversion at the top and bottom are additive and therefore, the total mode-conversion is cumulative, whereas in the reverse direction the top and bottom layer mode-conversions mutually cancel each other and there is no net mode-conversion.

In carrying out the teachings of this invention, the waveguide is made as a sandwich including a substrate of isotropic material, an upper layer of anisotropic material with a thin layer of magnetized magnetooptic material in between the substrate and upper layer. The materials are selected such that the index of refraction of the middle layer is greater than the substrate and upper layer. The waveguide is formed by growing a thin film of magnetooptic material, (about 1 $\mu$m thick), magnetized parallel to the Z axis, such as ferromagnetic garnet which may be YIG or a derivative thereof, onto an isotropic substrate such as gadolynium gallium garnet. A top layer of an anisotropic material with its optic axis in the YZ plane about 2 ± ½ degree from Y such as Lithium Iodate, LiIO$_3$, is secured upon the thin layer of magnetooptic material to form a sandwich. In this optical waveguide arrangement, operating at 1.152$\mu$m, the index of refraction of the substrate is $n = 1.888$, the index of refraction of the magnetooptic thin layer is $n = 2.216$, and the indices of refraction of the anisotiopic top layer are $n_o = 1.858$ and $n_e = 1.716$. The length required for mode conversion is about one (1) millimeter. Placing the magnetooptic material in the middle exploits the weak magnetooptic material to its best advantage.

A modification of the preferred arrangement is to form a sandwich of materials in which the substrate is magnetooptic, the upper layer is anisotropic, and the middle layer is isotropic. It has been determined that suitable materials for the upper layer is lithium niobate LiNbO$_3$, and a thin layer of isotropic material such as arsenic trisulfide, As$_2$S$_3$, is sputtered onto the magnetooptic substrate. The substrate is ferromagnetic garnet, YIG, or a derivative thereof. The upper layer is secured onto the middle layer and oriented such that the optical axis is slightly off perpendicular as set forth above.

The successful operation of the waveguide lies in the magnetooptic effect. When linearly polarized light propagates parallel to the magnetic field, its direction of polarization rotates as it travels. Thus, a TM mode wave incident on the waveguide will be rotated 90° on propagating through the waveguide and emerge as a TE mode wave because of its rotation during passage through the waveguide. Likewise, a TE mode wave propagating through the waveguide will be rotated 90° and emerge as a TM mode wave. However, due to the effect on the waves traversing the waveguide in the opposite direction the waves will emerge in the same mode as it was at the entrance. Therefore, the above described waveguides are nonreciprocal. It has been determined that nonreciprocal waveguide propagation will be achieved only if a magnetooptic material and a matching optically anisotropic crystal are employed in the waveguide. It is also important that the TE and TM modes have the same velocity on traversing the waveguide.

The optical waveguide has been set forth by way of two specific examples. Other arrangements may be assembled by any combination of the three materials; however, some arrangements function better than others.

Figure 2:
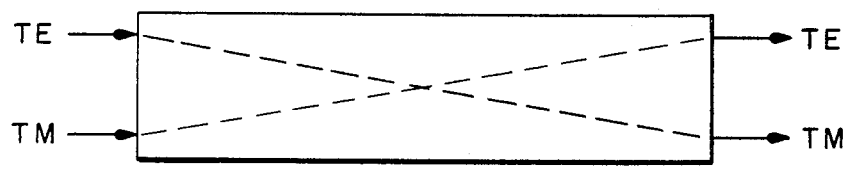
FIG. 2 illustrates the mode-conversion on passing through the optical waveguide in one direction.
Figure 3:
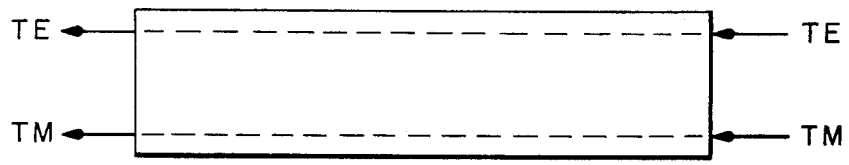
FIG. 3 illustrates the zero mode-conversion in the opposite direction.

In operation, the optical waveguide is assembled and properly magnetized or the elements are properly magnetized prior to assembly. A light beam in path A will be coupled into the waveguide and will emerge at B. A wave entering along wave B will emerge along C, a wave entering along C will emerge along D, and a wave entering along D will emerge along A. FIG. 2 illustrates the operation by use of TE and TM modes. A TE mode wave entering from the left will be rotated and emerge as a TM mode wave. A TM mode wave entering from the left will be rotated and emerge as a TE mode wave. Light entering from the right as a TE and TM mode will emerge as the same mode as it was upon entering. Therefore, the device is a good gyrator. Such an optical waveguide will find many uses such as an isolator, to decouple an oscillator (laser) from a modulator and subsequent circuitry; and a circulator, which would be required in the fabrication of a bi-directional optical repeater for optical fiber communication links.

Obviously many modifications and variations of the present invention are possible in the light of the above teachings. It is therefore to be understood that within the scope of the appended claims the invention may be practiced otherwise than as specifically described.

What is claimed is:

1. A nonreciprocal waveguide mode converter formed as a sandwich of different materials which comprises:
    a layer of magnetized magnetooptic material,
    a layer of anisotropic material oriented to produce mode conversion which is complementary to that produced by said magnetooptic material, and
    a layer of isotropic material.

2. A nonreciprocal optical waveguide as claimed in claim 1; wherein,
    the bottom layer of said waveguide is an anisotropic material.

3. A nonreciprocal waveguide as claimed in claim 1; wherein,
    the bottom layer of said waveguide is a magnetized magnetooptic material.

4. A nonreciprocal waveguide as claimed in claim 3; wherein, the top layer of said waveguide is an anisotropic material.

5. A nonreciprocal optical waveguide as claimed in claim 4; wherein,
    said anisotropic material is lithium niobate,
    said isotropic material is arsenic trisulfide, and
    said magnetized magnetooptic material is ferromagnetic garnet.

6. A nonreciprocal optical waveguide as claimed in claim 5; wherein,
    said layer of arsenic trisulfide has a thickness of about 1 micron, and
    the length of said waveguide is about 7 millimeters.

7. A nonreciprocal waveguide as claimed in claim 1; wherein,
    the bottom layer of said waveguide is an isotropic material.

8. A nonreciprocal waveguide as claimed in claim 7; wherein,
    said middle layer of said waveguide is a magnetized magnetooptic material.

9. A nonreciprocal optical waveguide as claimed in claim 8; wherein,
    said isotropic material is gadolynium gallium garnet,
    said magnetized magnetooptic material is ferromagnetic garnet, and
    said anisotropic material is lithium iodate.

10. A nonreciprocal optical waveguide as claimed in claim 9; wherein,
    said layer of magnetized magnetooptic material has a thickness of about 1 micron, and the length of said waveguide is about 1 millimeter.

11. A nonreciprocal optical waveguide as claimed in claim 9; wherein,
the optical axis of said anisotropic material is orientated about two degrees from the perpendicular to the propagation direction in the plane of the film.

12. A nonreciprocal optical waveguide as claimed in claim 7; wherein,
the top layer is magnetized magnetooptic material.

* * * * *